May 6, 1947.  W. O. SJOGREN  2,420,205
COUPLING
Filed Jan. 29, 1945
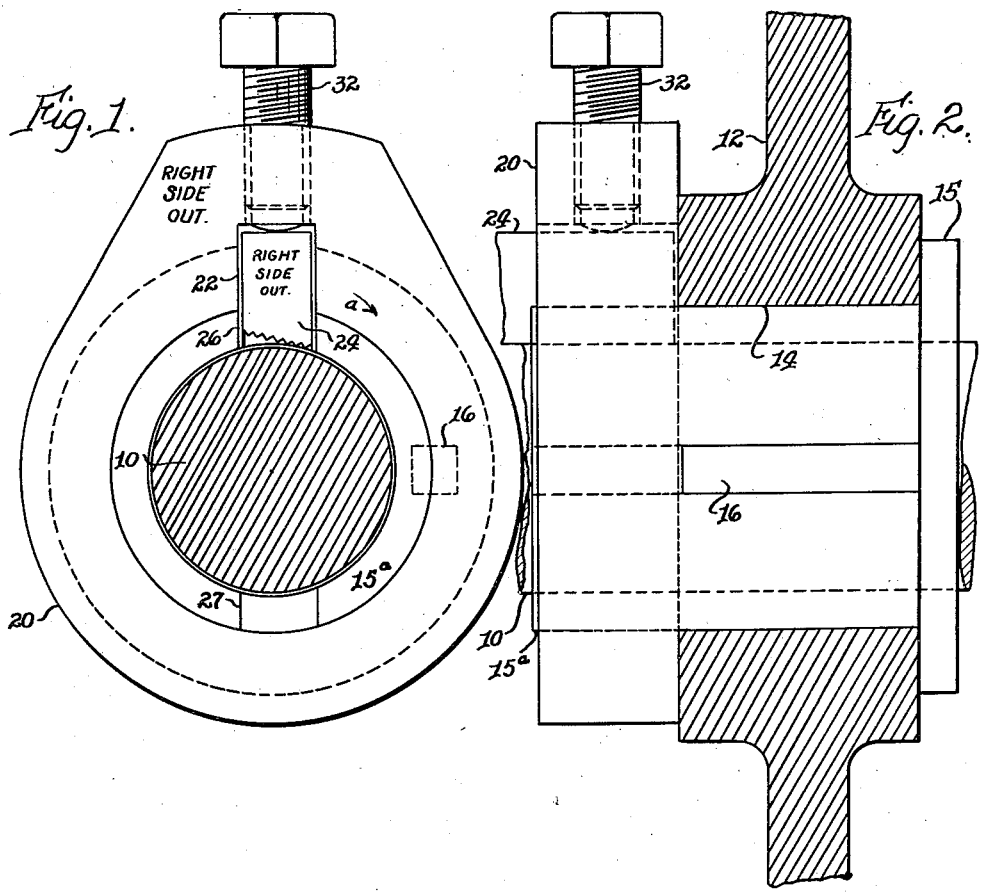
Fig. 1. Fig. 2.
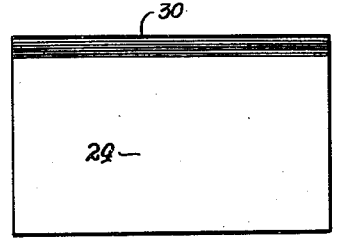
Fig. 4.  Fig. 3.  Fig. 5.
INVENTOR.
Walter O. Sjogren
BY
Chas. P. Hawley
Atty.

Patented May 6, 1947

2,420,205

UNITED STATES PATENT OFFICE 2,420,205

COUPLING

Walter O. Sjogren, Worcester, Mass.

Application January 29, 1945, Serial No. 575,010

7 Claims. (Cl. 287—52.09)

This invention relates to a coupling for connecting a rotated driving member to a shaft on which it is mounted and which is to be rotated thereby.

It is the general object of my invention to provide a coupling which will take a firm grip on the shaft to be rotated and which will increase its grip as increased resistance to turning is encountered.

A further object of my invention is to provide a coupling by which a shaft may be securely gripped and rotated in either direction.

My improved coupling is simple and economical to manufacture and has been proved reliable and satisfactory in use.

A preferred form of my invention is shown in the drawings, in which

Fig. 1 is an end elevation of my improved coupling with the shaft shown in section;

Fig. 2 is a side elevation thereof, with the driving member shown in section;

Fig. 3 is a front elevation of the shaft-engaging dog; and

Figs. 4 and 5 are left and right end elevations of the driving dog.

Referring to the drawings, I have shown a shaft 10 to be rotated by a driving member 12, such as a driving gear or pulley. The member 12 has an opening 14 somewhat larger than the shaft 10, and a flanged bushing 15 extends through the hub of the member 12 with a relatively close fit. The bushing is mounted on the shaft 10, preferably with a slightly looser fit. The hub of the member 12 may be secured to the bushing 15 by a key 16.

The bushing 15 extends substantially beyond the outer face of the driving member 12, as indicated at 15a in Fig. 2, and loosely supports a driving collar 20. The collar 20 has an axially extended recess 22 in which a driving dog 24 (Fig. 3) is loosely mounted. The end 15a of the bushing 15 is provided with slots or recesses 26 and 27 to loosely receive the inner edge portion of the dog 24. It will be noted that the recesses 22, 26 and 27 are all offset to the right in Fig. 1 with respect to the common center of the shaft 10, bushing 15 and collar 20.

At its inner end, the dog 24 is beveled and serrated as indicated at 30 (Figs. 4 and 5), and a set-screw 32 is provided for forcing the dog 24 against the surface of the shaft 10.

If the shaft is to be rotated clockwise or in the direction of the arrow a in Fig. 1, the dog 24 is mounted in the notch or recess 26 in the extension 15a of the bushing 15, but if anti-clockwise rotation of the shaft is desired, the collar 20 will be reversed and turned approximately 180°, and the block 24 will be reversed and seated in the opposite recess 27 of the bushing 15.

With the parts as shown in Fig. 1, driving force applied to the member 12 and bushing 15 will cause the left-hand wall of the recess 26 in the bushing extension 15a to engage the dog 24 and force the dog to the right in Fig. 1. If the dog is under pressure applied by the set-screw 32, the teeth of the dog will firmly grip and turn the shaft, and the greater the resistance the harder the teeth will engage. The gripping action is analogous to the action of the teeth in the ordinary Stillson pipe wrench.

To drive the shaft 10 in the opposite direction, the collar 20 is reversed and the dog 24 is also reversed and placed in the notch 27. The collar and dog are preferably plainly marked as indicated in the drawings, so that they may be easily and correctly assembled.

It will be noted that relatively light pressure by the set-screw 32 is required for a very firm grip, as compared with the pressure which would be required if the set-screw directly engaged the shaft 10. Furthermore, the dog 24 may be made of any desired length, so that the gripping surface will be correspondingly extended.

Having thus described my invention and the advantages thereof, I do not wish to be limited to the details herein disclosed, otherwise than as set forth in the claims, but what I claim is:

1. A coupling for a rotated shaft comprising a driving member loosely supported on said shaft and having an end slot laterally offset with respect to the center line of the shaft in the direction of rotation, an axially extended driving dog loosely mounted in said slot and having a beveled edge face engaging said shaft, and means to force said dog against said shaft.

2. The combination in a coupling as set forth in claim 1, in which the driving member has a second and oppositely offset slot and in which the dog is operative in either slot but in reverse positions to rotate the shaft in opposite directions.

3. A coupling for a rotated shaft comprising a driving member loosely supported on said shaft and having an end slot laterally offset with respect to the center line of the shaft in the direction of rotation, an axially extended driving dog loosely mounted in said slot and having a beveled edge face engaging said shaft, a collar loosely mounted on said driving member and slotted to loosely receive the outer portion of said dog, and means on said collar to engage and force said dog against the shaft.

4. The combination in a coupling as set forth in claim 3, in which the slot in the collar is laterally offset with respect to the center line of said collar and in which the collar is reversible on said driving member for opposite directions of rotation of said shaft.

5. The combination in a coupling as set forth in claim 3, in which the driving member has a hub portion and also includes a non-rotatably mounted bushing loose on said shaft, said bushing having an extension beyond the face of said hub portion and on which extension said collar is loosely mounted.

6. The combination in a coupling as set forth in claim 1, in which the driving member has a hub portion and also includes a non-rotatably mounted bushing within said hub portion and loose on said shaft, and in which said bushing has an extension beyond the face of said hub portion and in which extension the slot for the driving dog is formed.

7. The combination in a coupling as set forth in claim 1, in which the driving member has a hub portion and also includes a rotatably mounted bushing within said hub portion and loose on said shaft, and in which said bushing has an extension beyond the face of said hub portion and in which extension two laterally and reversely offset end slots are formed, either one of said slots being adapted to receive the driving dog but in reverse positions thereof for rotation of said shaft in opposite directions.

WALTER O. SJOGREN.

REFERENCES CITED

The following references are of record in the file of this patent:

UNITED STATES PATENTS

| Number | Name | Date |
| --- | --- | --- |
| 139,282 | Van Voorhis | May 27, 1873 |
| 77,747 | Miller et al. | May 12, 1868 |
| 362,767 | McNair | May 10, 1887 |